Aug. 21, 1934.   W. F. PEEK   1,970,976
ANIMAL TRAP
Filed July 12, 1933   2 Sheets-Sheet 1
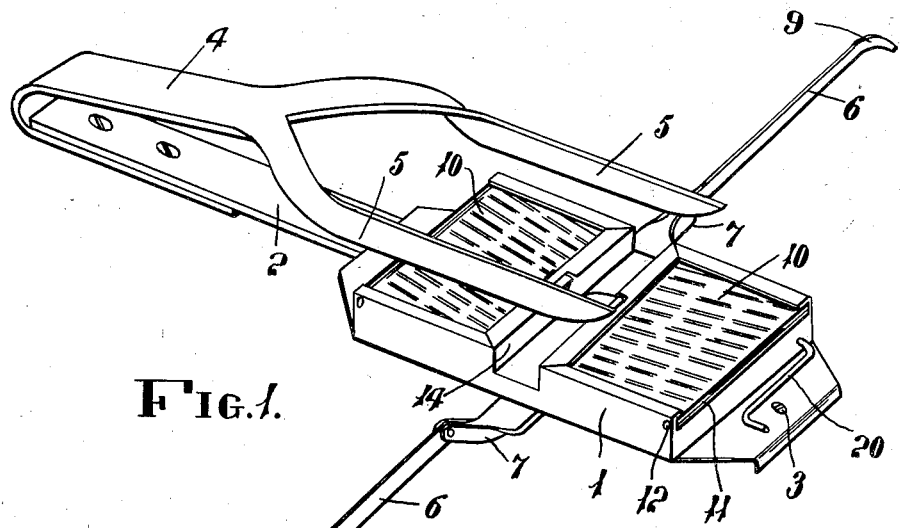
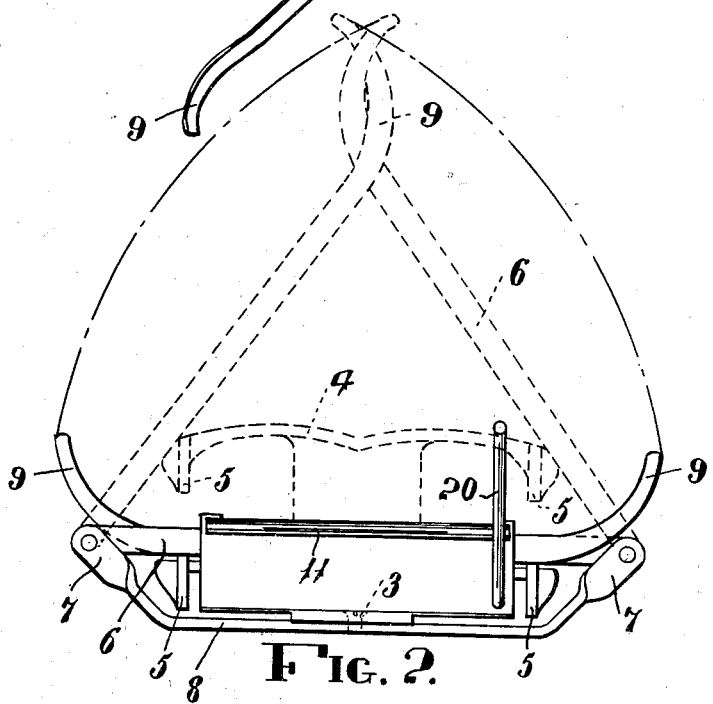
Inventor:-
William Tyson Peek.
Per:-
George Hughes
Attorney.

Aug. 21, 1934.  W. F. PEEK  1,970,976
ANIMAL TRAP
Filed July 12, 1933  2 Sheets-Sheet 2

Inventor:-
William Tyson Peek.
Per:-
George Hughes
Attorney.

Patented Aug. 21, 1934

1,970,976

UNITED STATES PATENT OFFICE 1,970,976

ANIMAL TRAP

William Fyson Peek, Brighton, England

Application July 12, 1933, Serial No. 680,105
In Great Britain September 6, 1932

2 Claims. (Cl. 43—92)

My present invention relates to improvements in and connected with animal traps of the type in which a pair of arms are provided formed with complementary parts shaped to grip the animal's neck, and which arms, when the trap is set, intersect each other, the arrangement being that when the trap is released by an animal, a spring acting on the arms urges them upwards so that they travel across each other to bring the said complementary parts together to grip the animal's neck. The object of this invention is to provide a trap of this type which will be easy to manufacture and which can be set so as to occupy a small shallow space.

According to my invention an animal trap employs a pair of trigger members or trap releasing plates with which co-operates a retaining member and is characterized by said retaining member being adapted to be engaged with abutments on both of said trigger members or trap releasing plates so as to lie across said arms at their point of intersection, whereby when an animal engages one of said triggers or releasing plates, the said retaining member is freed to release the arms so that their free ends are brought together by the spring about the animal's neck.

In order that my invention may be clearly understood and readily carried into effect, I have appended hereto a sheet of drawings illustrating an embodiment thereof, and wherein, Fig. 1 is a perspective view showing the trap not set.

Fig. 2 is a front elevation view showing the trap set.

Figure 3:
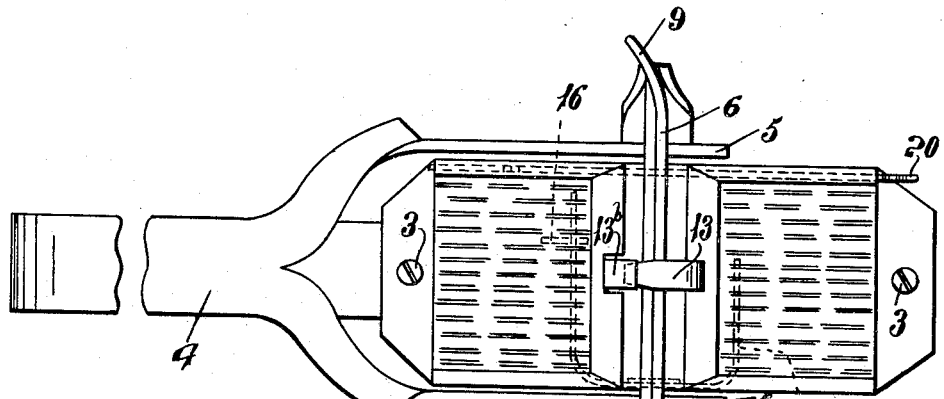
Fig. 3 is a plan view showing the trap set.
Figure 4:
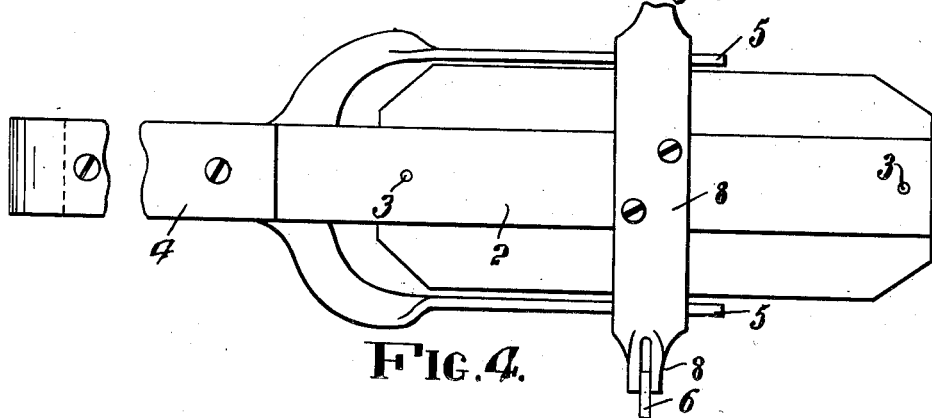
Fig. 4 is an inverted plan view of the trap not set.

Referring to the drawings, the trap comprises a shallow rectangular frame or tray 1 forming the base of the trap which tray is secured to a longitudinal bar 2 by screws 3. This bar 2 has fixed to one end of it one limb of an elongated U-shaped leaf spring 4 the other limb of which is appreciably longer and is spread or bifurcated at its free end to produce two fingers 5. This spring is a strong steel strip having a high degree of resiliency and is adapted to operate the trap.

The animals are trapped between the free ends of a pair of pivoted arms 6 each comprising a metal bar pivoted at one end to one of a symmetrically positioned pair of lugs 7 bent up from a crossbar 8 secured across the bottom of the base member 1. The free ends of these arms are curved symmetrically to produce animal trapping parts 9 which are adapted to grip about the animal's neck. These parts 9 are preferably slightly bent laterally at their free ends so that when the trap is released, if there is not an animal therein the free ends cross each other and abut against each other as shown in the broken lines in Fig. 2. With this arrangement the arms 6 will not move outwards beyond their central positions per se although they can be disengaged from each other and moved to the position shown in Fig. 1. These arms are arranged so that their edges engage the animal's neck, the edges which are uppermost when the trap is set (Fig. 2) preferably being bevelled or sharpened but not to such a degree as to cut the animal's skin.

Accommodated within the base 1 are a pair of trigger plates 10 pivoted near their outer edges as indicated at 10b by pins 12 secured in the longitudinal sides of the base 1 the plates being rolled about the pins 12. These two trigger plates substantially fill the opening in the upper side of the tray-like base 1 and the trap is operated by the animal standing upon one of such plates 10. The setting of the trap is effected by the swinging of the arms 6 towards each other until they intersect when they are pressed down upon the bifurcated part of the spring 5 so as to bend the free end of this spring downwards until the upper edges of the arms 6 lie in a plane or planes beneath a trigger 13 pivoted as at 13a to the upper edge of one of a pair of transverse walls 14 fixed to the base 1. An L-shaped metal retaining member 13b is pivoted as at 13c to the other wall 14 and its upper free end is slipped over the trigger 13. This is effected by swinging up the inner edge of one of the plates 10, which as indicated at 10a will press the retaining member 13b over the trigger 13 and set the trap.

A U-shaped length of stout wire 15 pivoted at its median part across the two walls 14 adjacent one longitudinal side of the base engages at one end under a hook 16 fixed to one of the plates 10 and engages at its other end the other plate 10. By this means if an animal treads on either plate 10 the trap is released.

The furcations 5 of the spring 4 are preferably twisted to bring their inner edges uppermost so as to obviate them being bent, when the trap is set.

As normally the trap would be set opposite a known exit from a burrow or in a predetermined track it is evident that an animal standing upon one of the plates 10 would have its neck over the set arms 6 and consequently the animal would be instantaneously killed by having its neck caught between the curved edges of such arms.

Figure 5:
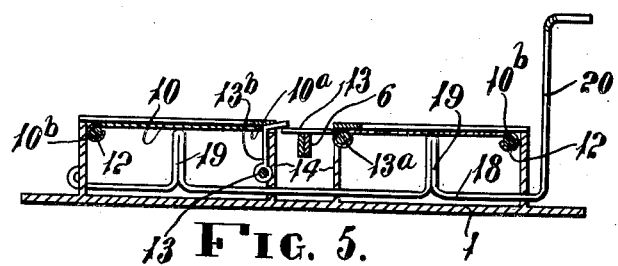
Fig. 5 is a sectional view showing a suitable device for setting the trigger members or trap releasing plates.

If desired the plates 10 can be raised about their pivot pins 12 to the set position by the partial axial rotation of a rod (see Fig. 5) rotatable beneath the said plates in the ends of the base 1 and formed with a pair of radial fingers 19 and a handle 20 so that by raising the handle the fingers 19 will engage and raise the plates 10 thereby setting the trap.

A trap according to this invention is humane in its operation and when set it can be accommodated in a shallow space inconspicuously.

What I claim is:—

1. An animal trap comprising a base plate having an extension thereon, a pair of arms pivoted at one end to opposite sides of said plate and bent arcuately or cranked at their other ends which are free, a leaf spring connected to the extension of said plate, and a pair of trap releasing plates movably carried by the base plate, the arrangement being such that the said arms are adapted to be swung towards each other so as to lie alongside each other above a free end of said leaf spring contiguous to the base plate or frame, a retaining member adapted to lie across said arms near their point of intersection, whereby when an animal engages one of said releasing plates, the said retaining member is freed to release the arms so as to bring their free ends together about the animal's neck, said trap releasing plates being shaped to nearly close the upper side of a frame-like base and being pivoted adjacent opposed inner edges and carrying upstanding parts shaped to receive a retaining pin.

2. An animal trap comprising a base plate having an extension thereon, a pair of arms pivoted at one end to opposite sides of said plate and bent arcuately or cranked at their other ends which are free, a leaf spring connected to the extension of said plate, a pair of trap releasing plates pivoted to the base plate near its ends and having opposed free edges, the arrangement being such that the said arms are adapted to be swung towards each other so as to lie alongside each other above the free end of said leaf spring contiguous to the base plate or frame, a retaining member disposed between the opposed free edges of said releasing plates, adapted to lie across said arms near their points of intersection, whereby when an animal engages one of said releasing plates, the said retaining member is freed to release the arms so as to bring their free ends together about the animal's neck.

WILLIAM FYSON PEEK.